C. A. GILKEY.
WATER HEATER.
APPLICATION FILED JAN. 25, 1915.
1,161,855.
Patented Nov. 30, 1915.
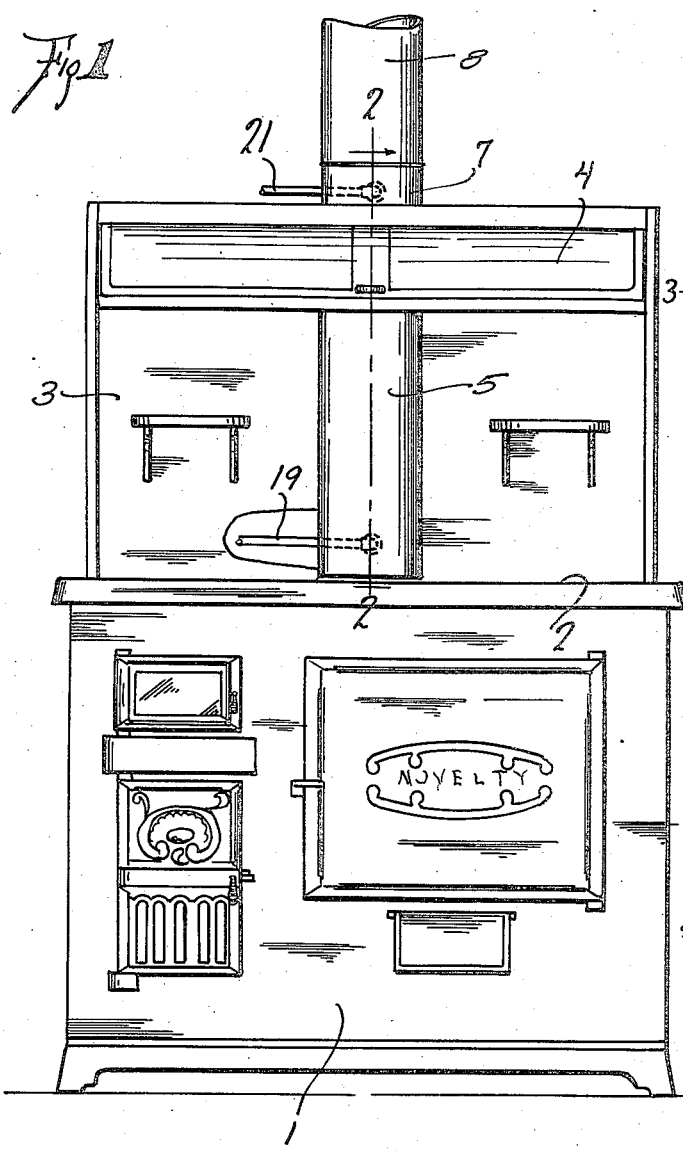
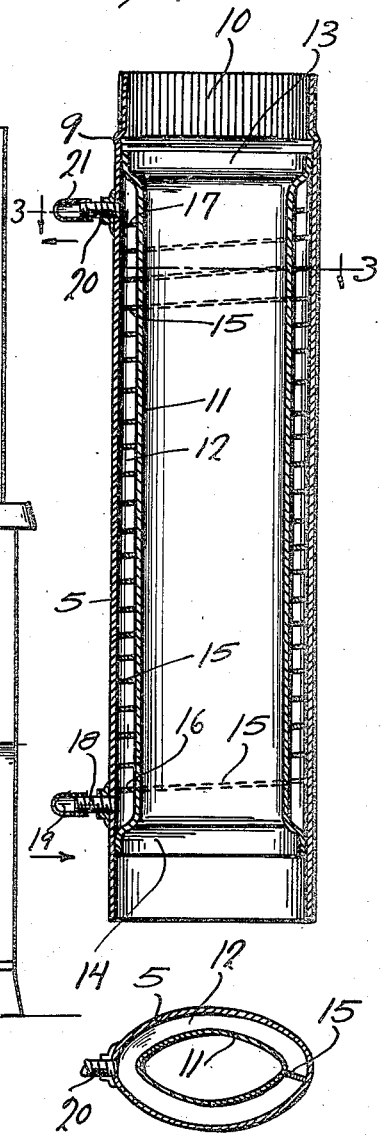

UNITED STATES PATENT OFFICE.

CLARENCE A. GILKEY, OF MEDICAL LAKE, WASHINGTON.

WATER-HEATER.

1,161,855.  Specification of Letters Patent.  Patented Nov. 30, 1915.

Application filed January 25, 1915. Serial No. 4,241.

*To all whom it may concern:*

Be it known that I, CLARENCE A. GILKEY, a citizen of the United States, residing at Medical Lake, in the county of Spokane and State of Washington, have invented certain new and useful Improvements in Water-Heaters, of which the following is a specification.

This invention relates to improvements in water heaters and has to do more particularly with that form of water heaters which is incorporated in the structure of a heating stove or range.

It is well known that the first joint of a stove pipe leading from a cooking range, radiates a great deal of heat which is entirely lost, and it is also well known that when a range is being operated with a dampered or slow fire, that the usual warming oven loses its heat and the temperature of the interior thereof goes down appreciably below that temperature which is most desirable in maintaining victuals warm, that is, above a relatively cold temperature. Furthermore, when combustion in the cooking range fluctuates, the warming oven temperature varies accordingly thereby frequently impairing the flavor of victual contents thereof by allowing the latter to become cold or practically so. Of course after a range has been operated for a long period of time, with a very hot fire, there is enough of the heat radiated and also transmitted to the warming oven to appreciably raise the temperature therein but the difficulty is that the temperature of the warming oven becomes too great, or too high, under such condition.

Now the object of this invention is to provide the first joint of the stove pipe with a water jacket of sufficient length to extend from a point below the warming oven, through and above the latter in such a manner that lost heat radiation from the first joint may not only be utilized to heat the water in the water jacket, but also, to utilize the water jacket for the purpose of preventing the transmission of a too high temperature to the warming oven. The water jacket also performs the function of a storage heater for storing heat transmitted from the first joint, so as thereby to impart the usual amount of heat to the warming oven and keep the same at the desired warming temperature even when the fire in the range is low.

A still further function performed by the water chamber is to accelerate draft in the stove pipe when the fire becomes low so as to facilitate increased combustion when it is desired to increase the heat of the range.

My invention will be more fully described in connection with the accompanying drawing and will be more particularly pointed out in and by the appended claim.

In the drawing:—Figure 1 is a view in side elevation of a cooking range equipped with the preferred form of the device of my invention; Fig. 2 is a sectional view on line 2—2 of Fig. 1; Fig. 3 is a sectional view on line 3—3 of Fig. 2.

Like characters of reference designate similar parts throughout the different figures of the drawing.

As illustrated, 1 designates a common type of kitchen cooking range having a range top 2. As usual, the back 3 of the range extends above the range top and is equipped with a warming oven 4. A pipe for egress of the products of combustion from the fire box of the range, includes a first joint 5, which extends from its point of connection 6 at the range top 2, upwardly through and slightly above the warming oven 4, as indicated at 7. The second joint 8 is shown connected with the first joint in the usual manner, the upper end of the first joint being provided with the usual bead 9 and reduced end 10.

Now referring to the improvement constituting my invention, 11 designates a sleeve having an intermediate or main body portion which is reduced in diameter with respect to the internal diameter of joint 5, sufficiently to provide an intervening water chamber 12. The sleeve 11 extends throughout the major portion of the length of joint 5 so as to afford not only an enlarged capacity but the greatest possible heating area, and the upper and lower ends 13 and 14, are enlarged or expanded to fit against the interior of joint 5 and I secure said ends in water-tight engagement to the joint 5 in any desirable manner.

Baffle means is interposed in said chamber so as to retard passage of the water therethrough and cause the latter to take the longest possible course thereby prolonging the period of contact with the sleeve 11 as far as possible.

In the form shown, a continuous strip 15 is spirally arranged in the water chamber at a pitch which so nearly approaches the horizontal that the water will practically travel through a distance many times the length of the sleeve 11 from the time it enters until it is drawn off from said chamber. The lowest point of said baffle means or strip is indicated at 16 and the uppermost point at 17. Below the lowermost point 16, I equip the first joint 5 with a nipple 18 to which an inlet pipe 19 is connected. Preferably the connection of pipe 19 will be at the rear of the range and I have broken away a portion of the back 3, in order to illustrate the latter. Egress is from the upper end of the water chamber which is provided with a nipple 20 connected with an outlet pipe 21. The inlet and outlet pipes may if desired be suitably provided with valves for controlling the flow of water or they may be directly connected in such a manner that my improved water heater may function as a supply heater to a tank but as these matters are not involved in my invention, the same are not herein illustrated.

It will be seen that the water in the chamber 12 is not only subjected to the intense heat passing through the first joint, throughout the lower portion of the heater, but by reason of the fact that the heater extends through the warming oven 4, I obtain practically a maximum heating area throughout the length of the sleeve 11 thereby enabling me to very quickly raise the temperature of a relatively large quantity of water.

It will be understood, that the heat transmitted to the water jacket or chamber by the warming oven will only be effective at such times as the range has been operated for a long period at a high temperature, and in this event, the water will act to absorb the heat in the warming oven to prevent the temperature in the latter from rising to a cooking or baking temperature.

By disposing the water heater interiorly of the first joint 5, practically no heat will be radiated therefrom without first being utilized or almost completely absorbed by the water in chamber 12. Furthermore, it will also be noted that heat transmission only passes through a single thickness of metal, and by making the sleeve 11 of copper or like metal of high heat conductivity, I am enabled to utilize practically all of the heat units.

It is believed that the advantages and utility of my invention will be fully understood from the foregoing description, and while I have herein shown and described one specific form of my invention, I do not wish to be limited thereto except for such limitations as the claim may import.

I claim:—

In a combined water heater and oven warmer for ranges, a range stove having a warming oven disposed at an elevation above the stove top, a first joint stove pipe extending from the stove top upwardly through said oven, a sleeve in said pipe joint extending from a point below said oven to a point above the latter and forming with said pipe joint a water heating chamber extending through said oven, a water inlet opening to said water chamber below said oven, and a water outlet opening to said water chamber above said oven, substantially as described.

In testimony whereof I affix my signature in presence of two witnesses.

CLARENCE A. GILKEY.

Witnesses:
 EDNA BROYLES,
 H. E. SMITH.